United States Patent
Kim et al.

(10) Patent No.: US 8,554,194 B2
(45) Date of Patent: Oct. 8, 2013

(54) METHOD AND SYSTEM FOR PROVIDING VIRTUAL MESSENGER SERVICE

(75) Inventors: Jung-Hun Kim, Busan (KR); Jae-Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1520 days.

(21) Appl. No.: 11/768,546

(22) Filed: Jun. 26, 2007

(65) Prior Publication Data

US 2007/0298777 A1   Dec. 27, 2007

(30) Foreign Application Priority Data

Jun. 26, 2006   (KR) .................. 10-2006-0057425

(51) Int. Cl.
| H04M 3/00 | (2006.01) |
| H04M 1/00 | (2006.01) |
| H04M 1/64 | (2006.01) |
| H04M 11/00 | (2006.01) |
| H04M 7/14 | (2006.01) |
| G06F 15/177 | (2006.01) |

(52) U.S. Cl.
USPC ........ 455/420; 455/418; 455/556.1; 709/220; 379/88.17; 379/93.05; 348/14.01

(58) Field of Classification Search
USPC ................................. 455/418, 420
See application file for complete search history.

(56) References Cited

U.S. PATENT DOCUMENTS

| 6,366,653 | B1* | 4/2002 | Yeh et al. ................. | 379/93.05 |
| 2004/0176133 | A1* | 9/2004 | Lipsit ..................... | 455/556.1 |
| 2004/0235520 | A1* | 11/2004 | Cadiz et al. .............. | 455/557 |
| 2005/0069101 | A1* | 3/2005 | Bear et al. ............... | 379/88.17 |
| 2005/0138032 | A1* | 6/2005 | O'Rourke et al. ........ | 707/10 |
| 2006/0212548 | A1* | 9/2006 | Faisal et al. ............. | 709/220 |
| 2007/0105538 | A1* | 5/2007 | Hassan et al. ........... | 455/418 |
| 2007/0139513 | A1* | 6/2007 | Fang ....................... | 348/14.01 |

FOREIGN PATENT DOCUMENTS

| KR | 1020030085744 | 11/2003 |
| KR | 1020040072847 | 8/2004 |

* cited by examiner

*Primary Examiner* — Timothy Pham
(74) *Attorney, Agent, or Firm* — The Farrell Law Firm, P.C.

(57) ABSTRACT

Provided are a method and a system for providing a virtual messenger service between a mobile communication terminal and a computer. The method includes executing a virtual messenger program for controlling a function of a mobile communication terminal, and receiving a telephone directory provided within the mobile communication terminal; displaying a messenger window when receiving a request for activating the messenger window that collectively includes the telephone directory and menus; generating a communication event message related with a selected telephone number of the other party; and transmitting the generated event message to the mobile communication terminal, and displaying a notification of a communication event to an other party.

14 Claims, 7 Drawing Sheets

METHOD AND SYSTEM FOR PROVIDING VIRTUAL MESSENGER SERVICE

PRIORITY

This application claims priority under 35 U.S.C. §119(a) of a Korean Patent Application filed in the Korean Intellectual Property Office on Jun. 26, 2006 and assigned Serial No. 2006-57425, the entire contents of which are incorporated herein by reference.

BACKGROUND OF THE INVENTION

1. Field of the Invention

The present invention relates generally to a method and system for providing a messenger service, and in particular, to a method and system for providing a virtual messenger service for enabling a user to use various functions of a mobile communication terminal similar to using a messenger service.

2. Description of the Related Art

In recent years, users have gotten used to using a messenger service through a Personal Computer (PC). The messenger service refers to a service for enabling the user to exchange an instant message with other online Internet users. In order to use the messenger service, the user has to access a service provider's Web page, subscribe for a membership, and create his/her messenger account.

In order for the user to use the messenger service by a mobile communication terminal, the mobile communication terminal should be equipped with a wireless Internet browser, and access a wireless Internet. After the user accesses a messenger server by the mobile communication terminal, he/she can select a desired menu such as chatting and message sending, and communicate with another party over Internet.

The conventional messenger service includes a menu for interworking with the mobile communication terminal and the other party over the Internet. However, this is inconvenient in that the conventional messenger service cannot be provided until the mobile communication terminal is in an online access state based on the wireless Internet. A messenger service for enabling a membership user to exchange the instant message even with a non-membership user is being required for the user's convenience.

As described above, the user is inconvenient in using, by the mobile communication terminal, a familiar messenger service on the PC because of a limited size of a screen of the mobile communication terminal and Internet access. It is being also required to consider the user's convenience in using various functions of the mobile communication terminal as the user gets used to communication circumstances such as the messenger service used on the PC.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method and system for providing a virtual messenger service for enabling a user to easily use a function of a mobile communication terminal similar to using a messenger service.

Another aspect of exemplary embodiments of the present invention is to provide a method and system for providing a virtual messenger service for enabling one party to exchange a message with another party without wireless Internet access similar to using a messenger service.

According to an aspect of exemplary embodiments of the present invention, there is provided a method for providing a virtual messenger service in a computer. The method includes executing a virtual messenger program for controlling a function of a mobile communication terminal, and receiving a telephone directory that is provided within the mobile communication terminal, when the mobile communication terminal accesses the computer; displaying a messenger window when receiving a request for activating the messenger window that collectively includes the telephone directory and menus for controlling the function of the mobile communication terminal; generating a communication event message related with a selected telephone number of the other party when the telephone number is selected from the telephone directory; and transmitting the generated event message to the mobile communication terminal, and displaying a notification of a communication event to the other party.

According to another aspect of exemplary embodiments of the present invention, there is provided a system for providing a virtual messenger service between a mobile communication terminal and a computer. The system includes the computer for activating the virtual messenger service for controlling a function of the mobile communication terminal and receiving a telephone directory provided within the mobile communication terminal, when the mobile communication terminal accesses the computer, and generating a communication event message related with a selected telephone number of the other party and transmitting the communication event message to the mobile communication terminal, when the telephone number of the other party is selected in a messenger window collectively including the telephone directory and menus for controlling the function of the mobile communication terminal; and the mobile communication terminal for synchronizing with the computer and transmitting the telephone directory to the computer, when accessing the computer, and displaying a notification of a communication event to the other party when receiving the communication event message from the computer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EXEMPLARY EMBODIMENTS

Figure 1:
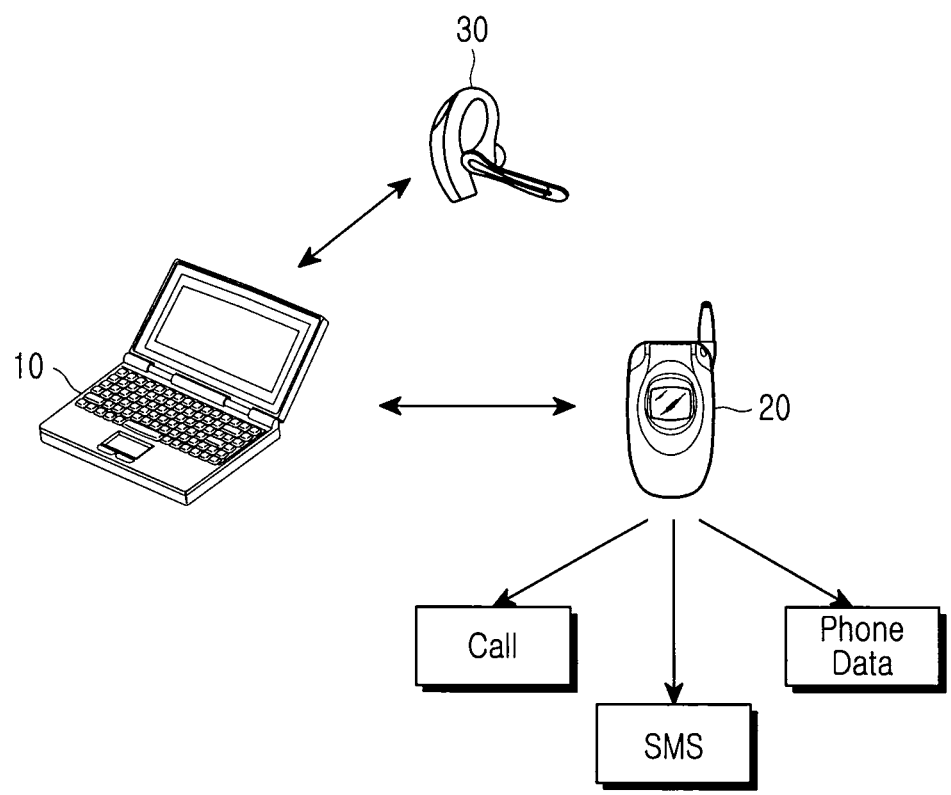
FIG. 1 is a diagram illustrating the architecture of a system for providing a virtual messenger service according to an exemplary embodiment of the present invention.

Exemplary embodiments of the present invention will now be described in detail with reference to the annexed drawings. In the drawings, the same or similar elements, features and structures are denoted by the same reference numerals even though they are depicted in different drawings. In the following description, a detailed description of known functions and configurations incorporated herein has been omitted for conciseness.

The present invention provides a function for enabling a user to more conveniently use a communication function of a mobile communication terminal. Accordingly, an exemplary embodiment of the present invention can enable a Personal Computer (PC) to open a messenger window and perform data intermediation with the mobile communication terminal, when a user activates a virtual messenger service in a state where the mobile communication terminal accesses the PC. In detail, the PC displays a notification of an event generated by the mobile communication terminal, using a screen. The PC includes various menus in the messenger window so that the user can easily use a function of the mobile communication terminal. Thus, the user can exchange a message with the other party using the messenger window of the PC similar to using the messenger service, and can easily manage data in the mobile communication terminal.

FIG. 1 is a diagram illustrating the architecture of a system for providing a virtual messenger service according to an exemplary embodiment of the present invention.

Referring to FIG. 1, the inventive system includes a PC 10, and a mobile communication terminal 20 for accessing the PC 10.

The PC 10 accesses the mobile communication terminal 20 using Universal Serial Bus (USB) and Bluetooth® (hereinafter, Bluetooth) techniques. The PC 10 provides the virtual messenger service for enabling the user to easily use various functions of the mobile communication terminal 20 through the menu of the messenger window in the same manner as using a general messenger service. Desirably, a messenger program necessary for execution of the virtual messenger service is not only installed in the PC, but also installed in the mobile communication terminal for interworking with the PC.

By this messenger program, the PC 10 can execute a virtual messenger program for controlling the function of the mobile communication terminal 20, and receive data such as a phonebook list from the mobile communication terminal 20, when the mobile communication terminal 20 accesses the PC 10. Then, the PC 10 displays the other party's list in the messenger window, thereby enabling the user to easily select the other party for messaging and voice call.

The messenger window represents a window collectively including the phonebook list and the menus for controlling the function of the mobile communication terminal 20. The messenger window is displayed in a pop-up window form.

Similar to using the general messenger service, the user can select the other party by clicking with a mouse and use the messenger service such as the voice call and messaging. The user can use a voice call function by a headset 30 connecting with the PC 10, without putting the mobile communication terminal 20 to an ear.

The mobile communication terminal 20 is synchronized with the PC 10 using the USB and Bluetooth techniques, and communicates data such as a message and a call with the PC 10. Upon receipt of a communication event from a mobile communication network, the mobile communication terminal 20 transmits the received communication event to the PC 10 through the virtual messenger program. The PC 10 can display a pop-up window associated with the communication event, thereby displaying to the user a notification of the receipt of the communication event from the mobile communication terminal 20. Similarly, the user can use a relation menu of the mobile communication terminal, such as a call, a Short Message Service (SMS), and phone data, through the messenger window in the PC 10, using the virtual messenger program. Accordingly, upon receipt of a created message from the PC 10, the mobile communication terminal 20 transmits the received message to the other party through the mobile communication network, using an SMS technique. Upon receipt of a request for an outgoing call from the PC 10, the mobile communication terminal 20 attempts a call connection to the mobile communication network.

Figure 2:
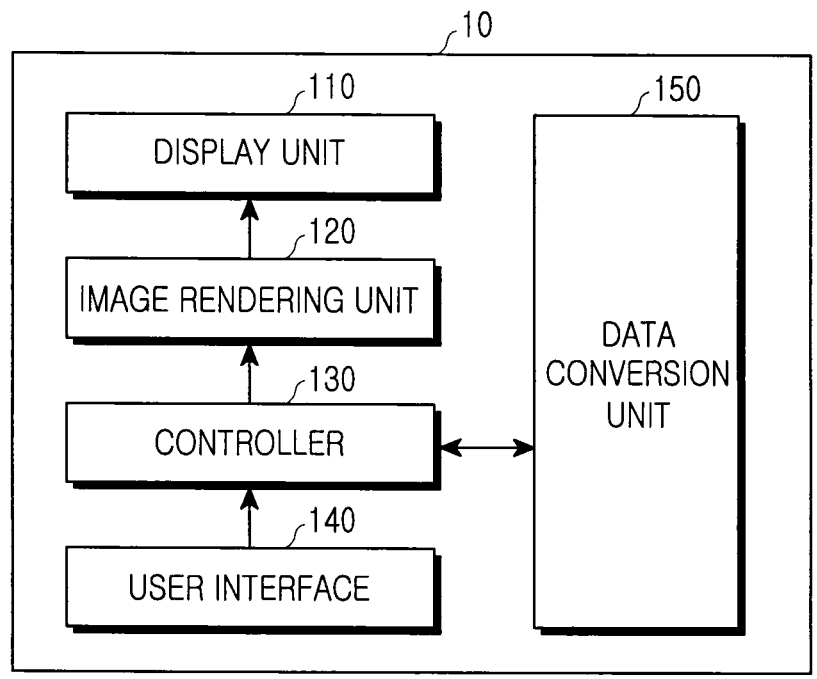
FIG. 2 is a block diagram illustrating an internal construction of a Personal Computer (PC) for providing a virtual messenger service according to an exemplary embodiment of the present invention.

Operation of the PC 10 for controlling operation of the mobile communication terminal 20 according to an exemplary embodiment of the present invention will be now described with reference to FIG. 2. FIG. 2 is a block diagram illustrating an internal construction of the PC for providing the virtual messenger service according to an exemplary embodiment of the present invention.

Referring to FIG. 2, the PC 10 includes a display unit 110, an image rendering unit 120, a controller, 130, a user interface 140, and a data conversion unit 150.

The display unit 110 displays contents associated with the communication event generated by the mobile communication terminal 20. The display unit 110 displays the event contents in the pop-up window form. The display unit 110 displays the messenger window collectively including the other party's list, and the menus expressing various functions of the mobile communication terminal 20 by symbols or pictures. The messenger window displays icons in various shapes such as a letter envelope shape for expressing a character message item of the mobile communication terminal 20, a telephone shape for expressing a telephone call item, and a folder shape for expressing a file item. Thus, it shows whether the icon expresses any function of the mobile communication terminal.

The image rendering unit 120 renders an image to be displayed on the display unit 110 under the control of the controller 130. In detail, the image rendering unit 120 activates and displays the messenger window on the display unit 110. The image rendering unit 120 renders and displays the pop-up window associated with the communication event.

The controller 130 analyzes data received from the data conversion unit 150, and determines whether it performs any operation. Thus, if receiving data from the mobile communication terminal 20 through the data conversion unit 150, the controller 130 controls the image rendering, unit 120 for displaying data. If receiving a control signal for selecting a menu item of the messenger window from the user interface 140, the controller 130 controls the image rendering unit 120 to display a window for executing the selected menu item. For example, if the character message item is selected, a message input window is displayed, and the message is created in the message input window. Thereafter, depending on the selection of the menu item, the controller 130 transmits data generated to the data conversion unit 150. In case where the selected menu item is an item for controlling communication of the mobile communication terminal 20, the data is transmitted to the mobile communication network through the mobile communication terminal 20.

The user interface 140 controls various functions of the mobile communication terminal 20. The user interface 140 transmits its inherent data based on data input from a keyboard or the mouse, to the controller 130. The controller 130 detects whether the data is based on any data input from the keyboard or the mouse, and performs an operation associated with the detection result.

For the compatibility of data exchanged with the mobile communication terminal 20, the data conversion unit 150 converts data transmitted to the mobile communication terminal 20 into data having a format recognizable by the mobile communication terminal 20. The data conversion unit 150 converts data received from the mobile communication terminal 20 into data having a format recognizable by the PC 10. In other words, the data conversion unit 150 performs a data conversion so that a smooth data exchange between the PC 10 and the mobile communication terminal 20 can be made.

Figure 3:
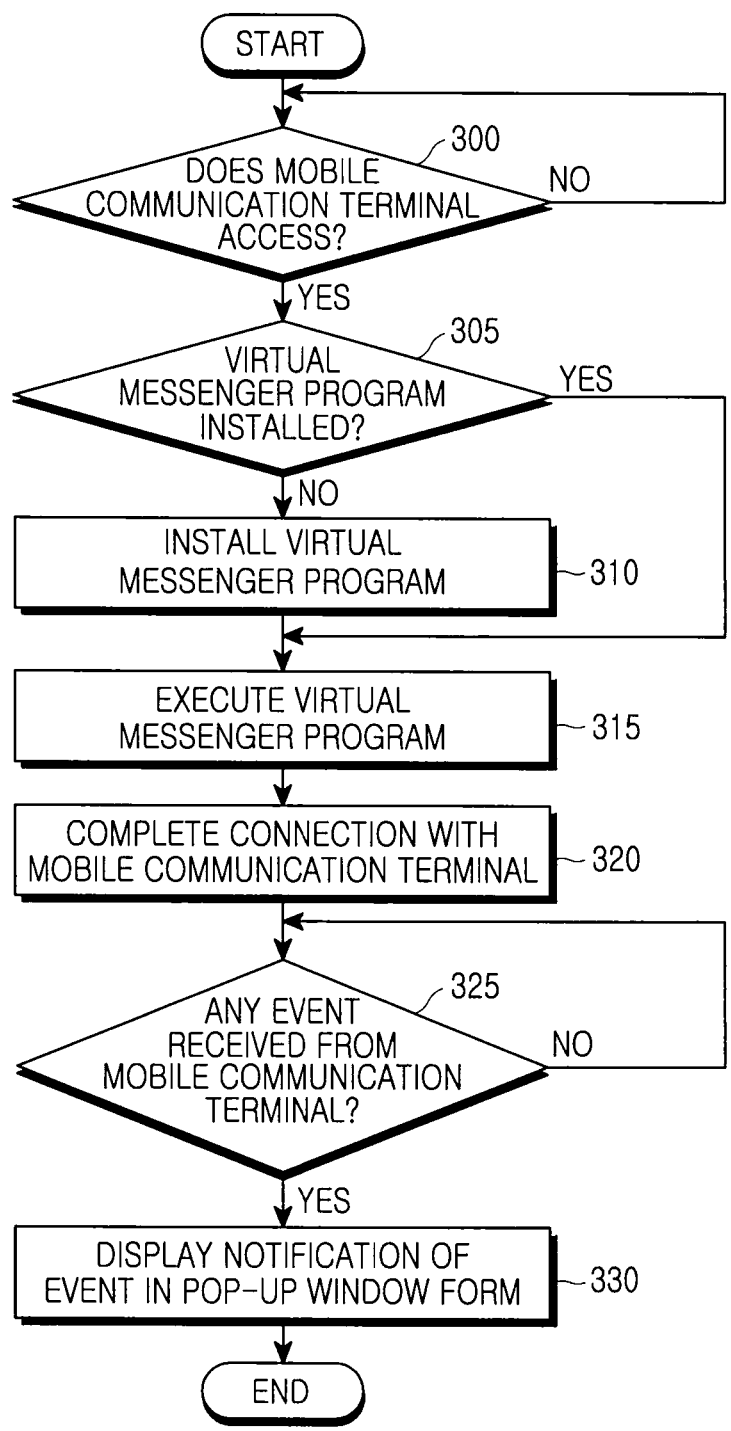
FIG. 3 is a flowchart illustrating a method for controlling a PC when a mobile communication terminal accesses the PC according to an exemplary embodiment of the present invention.

Operation of the PC when the mobile communication terminal accesses the PC will be described below with reference to FIG. 3. FIG. 3 is a flowchart illustrating a method for controlling the PC when the mobile communication terminal accesses the PC according to an exemplary embodiment of the present invention.

Referring to FIG. 3, the PC 10 determines whether the mobile communication terminal 20 accesses the PC 10 in Step 300). In detail, the PC 10 determines whether the mobile communication terminal 20 accesses itself through the USB and Bluetooth techniques. In Step 350, when the mobile communication terminal 20 attempts to access the PC 10, the PC 10 determines whether the virtual messenger program for data exchange is installed in the mobile communication terminal 20. In Step 310, upon determining that the virtual messenger program is not installed, the PC 10 installs the virtual messenger program in the mobile communication terminal 20. The above description is based on an example in which the PC 10 determines whether the virtual messenger program is installed in the mobile communication terminal 20. If not installed, the PC 10 installs a built-in program in the mobile communication terminal 20. However, when attempting to access the PC 10, the mobile communication terminal 20 determines whether the virtual messenger program is installed in the PC 10. If not installed, the mobile communication terminal 20 installs its built-in program in the PC 10.

In case where the program is installed or is previously installed as mentioned above, the PC 10 executes the installed virtual messenger program in Step 315. In Step 320, the PC 10 completes an access of the mobile communication terminal 20. The execution of the virtual messenger program leads to data synchronization between the mobile communication terminal 20 and the PC 10. Thus, the PC 10 receives the data such as the phonebook list from the mobile communication terminal 20.

Figure 4:
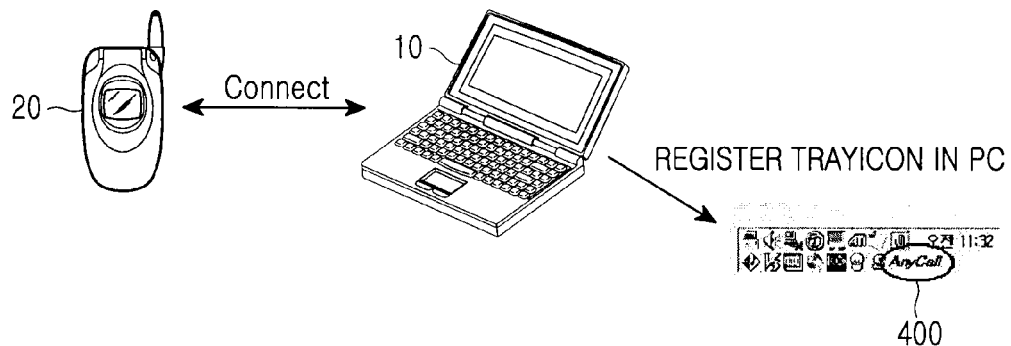
FIG. 4 is a diagram illustrating an example of transmitting a notification of an access state of a mobile communication terminal according to an exemplary embodiment of the present invention.

If the access between the PC 10 and the mobile communication terminal 20 is completed as mentioned above, a Trayicon 400 of FIG. 4 is displayed in a tray area of the screen of the PC 10 owing to the virtual messenger program. The Trayicon 400 represents an icon for expressing a state where the mobile communication terminal 20 accesses the PC 10, and a state where the virtual messenger service is available.

Figure 5:
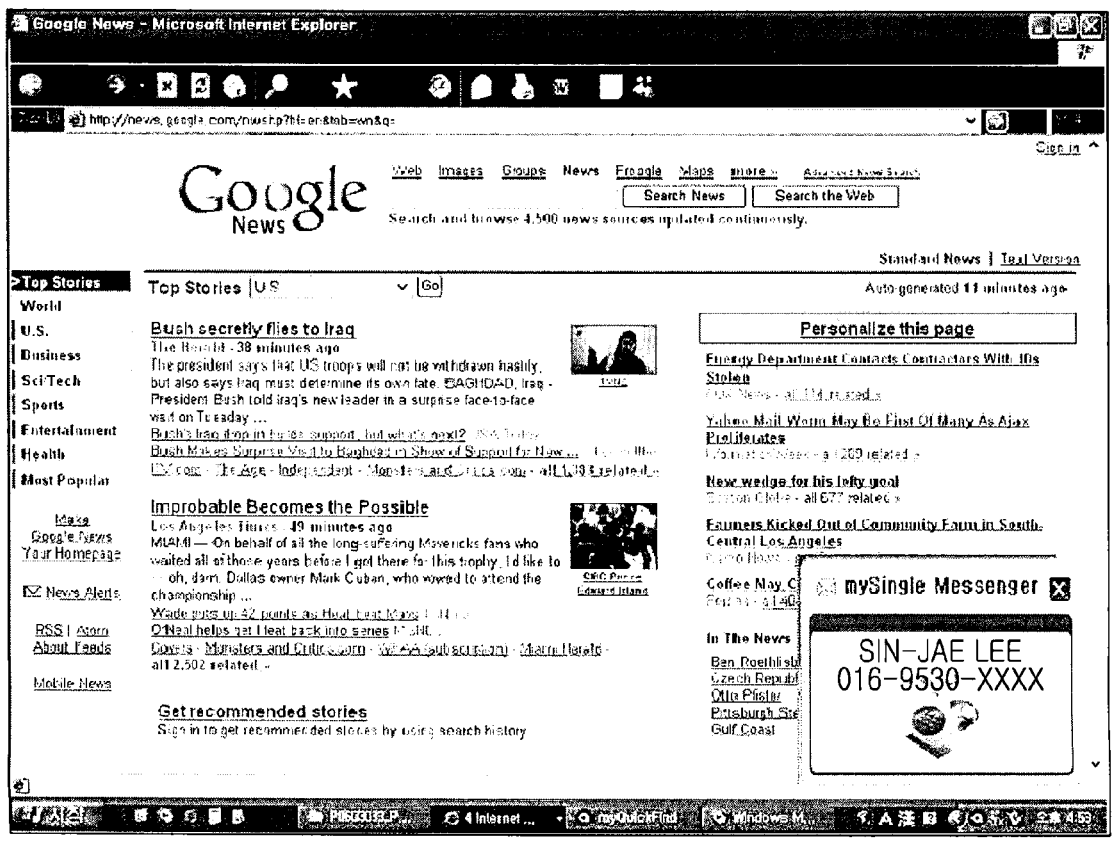
FIG. 5 is a diagram illustrating an example of a screen of a PC when an event of a mobile communication terminal is generated according to an exemplary embodiment of the present invention.

Thereafter, in Step 325, the PC 10 determines whether an event is received from the mobile communication terminal 20. According to an exemplary embodiment of the present invention, the event represents the communication event such as an incoming call and a reception of a message based on the mobile communication network. Upon determining that there is the received event in step 330, the PC 10 displays the event in the pop-up window form, thereby displaying the notification of the event to the user. In detail, in case where the user works using the PC 10 that the mobile communication terminal 20 accesses, the mobile communication terminal 20 transmits data based on the incoming call or the reception of the character message, to the PC 10, and the PC 10 displays a notification of the incoming call or the reception of the character message to the user, when there is the incoming call or the reception of the character message by the mobile communication terminal 20. Referring to FIG. 5 for example, when there is the incoming call by the mobile communication terminal 20 while the user works, the PC 10 performs intermediation for the incoming call, opens the pop-Lip window at a lower side of the screen, and displays the notification of the incoming call to the user. In detail, the PC 10 opens a message notification window and displays to the user the notification of the event associated with the data received from the mobile communication terminal 20, in the same manner as using a general messenger, as shown in FIG. 5. Accordingly, the user can telephone without ceasing work, using the headset 30 connecting to the PC 10, when recognizing the incoming call or the reception of the character message and accepting it through a mouse-click method.

Figure 6:
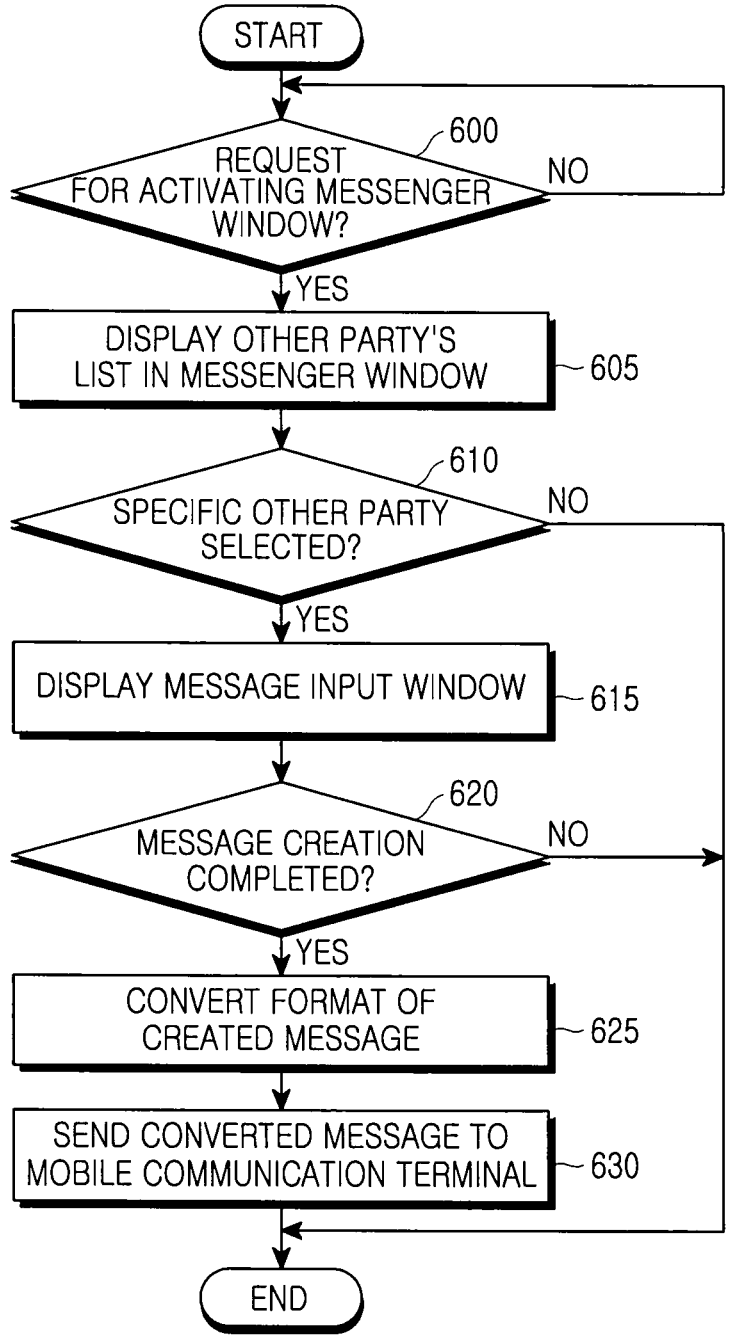
FIG. 6 is a flowchart illustrating a method for controlling a PC when a messenger service is used according to an exemplary embodiment of the present invention.

Operation of the PC 10 based on the menu of the messenger window will be described below with reference to FIG. 6. FIG. 6 is a flowchart illustrating a method for controlling the PC when the messenger service is used according to an exemplary embodiment of the present invention. The following description refers to examples illustrated in FIG. 7 and FIGS. 8A and 8B for its detailed description.

Referring to FIG. 6, in Step 600 the PC 10 determines whether a request for activating the messenger window is inputted by the user. The activating of the messenger window is implemented by user's double-clicking the Trayicon displayed in the tray area of the screen of the PC 10. In case where the user intends to telephone, transmit a message, or check data within the mobile communication terminal 20, the user can double-click the Trayicon of the PC 10, thereby opening the messenger window collectively including the icons expressing the functions of the mobile communication terminal 20.

Figures 7A, 7B:
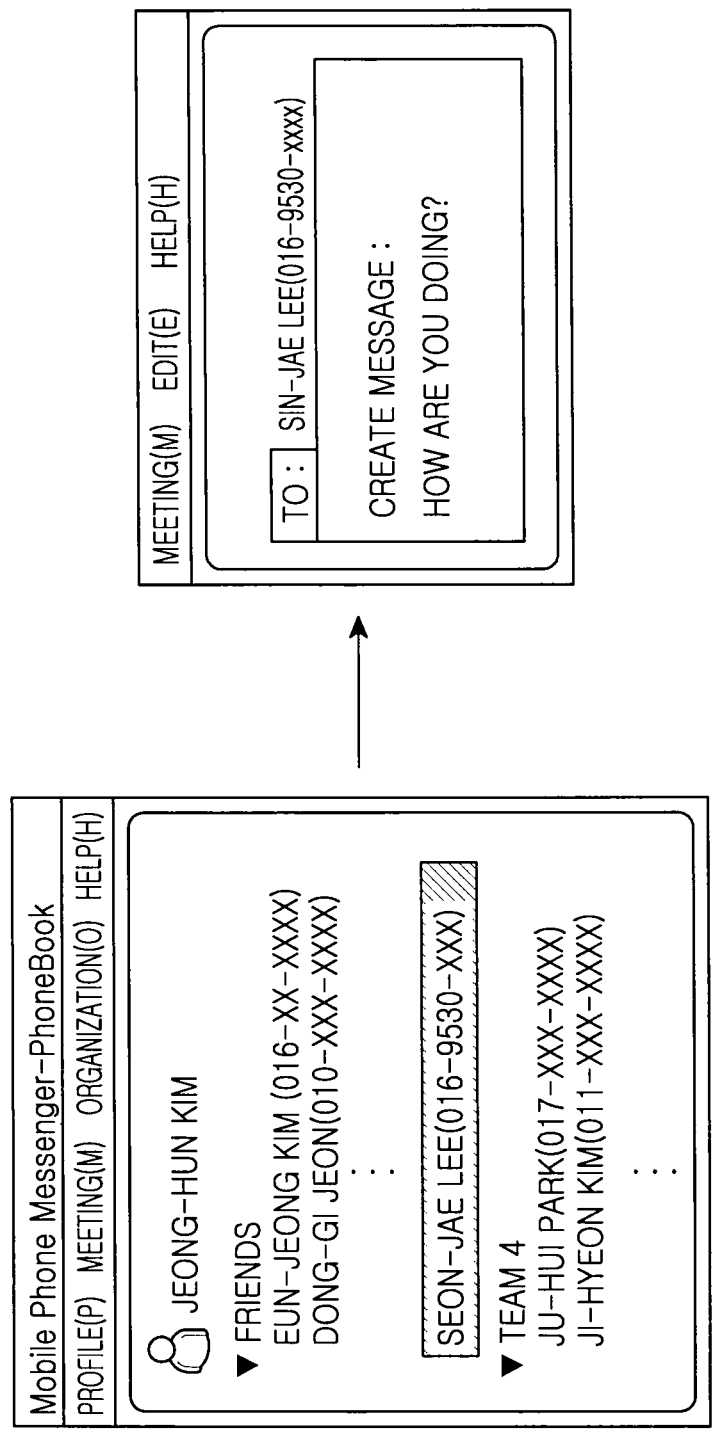
FIGS. 7A and 7B are diagrams illustrating examples of a screens for creating a message in a messenger window according to an exemplary embodiment of the present invention.

When determining that the messenger window activation request is inputted in the Step 600, the PC 10 displays the other party's list in the messenger window in Step 605, as shown in FIG. 7A. In addition to the other party's list, the menus for controlling the functions of the mobile communication terminal 20 are expressed using the icons in the messenger window. In general, the other party's list displayed in the messenger window represents a talking party's list subscribing to the messenger service. According to an exemplary embodiment of the present invention, the other party's list represents the phonebook list that the PC 10 receives when the mobile communication terminal 20 accesses the PC 10. In Step 610, the PC 10 determines whether a specific other party is selected. The selecting of the other party from the other party's list call be implemented by double-clicking the mouse with a cursor put on a name of the other party. When the specific other party is selected the PC 10 displays the message input window as shown in FIG. 7B in Step 615. Thus, the user can create the message similar to talking by a messenger. In Step 620, the PC 10 determines whether the user has completed to create the message. In Step 625, when the user has completed creating of the message, the PC 10 performs data conversion from a format of the created message to the format recognizable by the mobile communication terminal 20.

In Step 630, the PC 10 transmits the converted message to the mobile communication terminal 20 so that the mobile communication terminal 20 can transmit the message to the selected other party by the SMS technique. Thus, the mobile communication terminal 20 can transmit the created message to a telephone number of the selected specific other party. As mentioned above, the PC 10 generates a communication event message related with the telephone number of the selected other party, and transmits the generated event message to the mobile communication terminal 20, thereby displaying the notification of the communication event to the selected other party. According to an exemplary embodiment of the present invention, the user can directly create and transmit the message or telephone to the other party with convenience by only double-clicking the desired other party of the phonebook list displayed in the messenger window. In other words, the user can easily control the function of the mobile communication terminal 20 without directly manipulating the mobile communication terminal 20, using the letter envelope icon expressing the character message and the telephone icon expressing the telephoning.

Figure 8A:
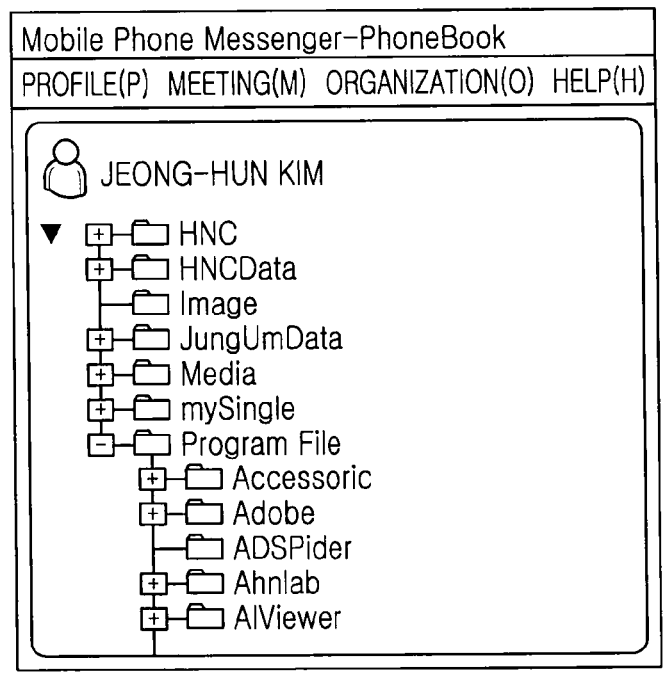
FIGS. 8A and 8B are diagrams illustrating examples of screens for managing a file in a messenger window according to an exemplary embodiment of the present invention.
Figure 8B:

The above description is based on an exemplary method of transmitting the character message or telephoning through the menu of the messenger window. However, data such as a folder list and a photograph list in addition to the phonebook list can also be exchanged with each other using the virtual messenger program. By the virtual messenger program, the user can simply modify and store user information difficult to be edited in the mobile communication terminal 20. The user can view a file stored in the mobile communication terminal 20 using a file explorer, as shown in FIG. 8A. The user can view or modify images stored in the mobile communication terminal 20 on the screen of the PC 10, using a photograph menu of the messenger window, as shown in FIG. 8B. As such, the PC 10 smoothly exchanges data with the mobile communication terminal 20, and intermediates the message with the mobile communication terminal 20 using the general mobile communication network.

As described above, the present invention has an advantage that, similar to using the messenger service, the user can easily manipulate the function of the mobile communication terminal by the virtual messenger program in a state where the mobile communication terminal accesses the PC. The present invention has an advantage that, similar to using the messenger service, the user can exchange the message with the other party on the PC by the mobile communication terminal without accessing the wireless Internet.

While the present invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A method for providing a virtual messenger service in a computer, the method comprising:
executing a virtual messenger program for controlling a function of a mobile communication terminal, and receiving a phonebook list having a plurality of telephone numbers from the mobile communication terminal, when the mobile communication terminal accesses the computer;
displaying a Trayicon expressing a state where the virtual messenger service is available, in a tray area of a screen of the computer prior to displaying a messenger window, when the mobile communication terminal completes an access to the computer by executing the virtual messenger program;
displaying the messenger window when receiving a request for activating the messenger window that collectively includes the phonebook list and menus for controlling the function of the mobile communication terminal;
generating a communication event message for data or an outgoing call to a selected telephone number of an other party when the telephone number is selected from the phonebook list; and
transmitting the generated communication event message to the mobile communication terminal for notifying a communication event to the other party;
determining whether there is the communication event received from the mobile communication terminal in a state where the virtual messenger program is executed; and
displaying a notification of the receipt of the communication event in a pop-up window form on a screen of the computer, when determining that there is the received communication event.

2. The method of claim 1, further comprising:
determining whether the virtual messenger program is installed in the mobile communication terminal, when the mobile communication terminal accesses the computer; and
installing the virtual messenger program in the mobile communication terminal, when it is determined that the virtual messenger program is not installed.

3. The method of claim 1, wherein the request for activating the messenger window is performed by double-clicking the Trayicon with a mouse.

4. The method of claim 1, wherein the generation of the communication event message comprises:
displaying a message input window;
converting a format of a created message to a format recognizable by the mobile communication terminal, when the message is created by a user in the message input window; and
generating the communication event message.

5. The method of claim 4, wherein the messenger window displays an icon including at least one of a letter envelope shape expressing a character message item of the mobile communication terminal, a telephone shape expressing a telephone call item, and a folder shape expressing a file item.

6. The method of claim 1, wherein a voice call is performed through a headset connected to the computer when the received communication event is an incoming call.

7. The method of claim 1, wherein the messenger window displays an icon based on at least one of a letter envelope shape expressing a character message item of the mobile communication terminal, a telephone shape expressing a telephone call item, and a folder shape expressing a file item.

8. A system for providing a virtual messenger service between a mobile communication terminal and a computer, the system comprising:
the computer for activating the virtual messenger service for controlling a function of the mobile communication terminal and receiving a phonebook list having a plurality of telephone numbers from the mobile communication terminal, when the mobile communication terminal accesses the computer, and generating a communication event message for data or an outgoing call to a selected telephone number of an other party and transmitting the communication event message to the mobile communication terminal, when the telephone number of the other party is selected in a messenger window collectively including the phonebook list and menus for controlling the function of the mobile communication terminal; and the mobile communication terminal for synchronizing with the computer and transmitting the phonebook list to the computer when accessing the computer, and receiving the communication event message from the computer for notifying a communication event to the other party, wherein the computer displays a Trayicon for expressing a state where the virtual messenger service is available, in a tray area of a screen of the computer prior to displaying the messenger window, when the mobile communication terminal completes an access to the computer by executing a virtual messenger program, wherein the computer displays a notification of the receipt of the communication event in a pop-up window form on a screen of the computer, upon receiving the communication event from the mobile communication terminal in a state where the virtual messenger program is executed.

9. The system of claim 8, wherein the mobile communication terminal attempts a call connection to the selected telephone number when receiving the communication event message from the computer.

10. The system of claim 8, wherein the mobile communication terminal transmits a short message to the selected telephone number through a Short Message Service (SMS) technique when the communication event message received from the computer is the short message.

11. The system of claim 8, wherein the computer displays a message input window when the telephone number of the other party is selected, and converts a format of a created message to a format recognizable by the mobile communication terminal when the message is created by a user in the message input window, thereby generating the communication event message.

12. The system of claim 8, wherein the computer determines whether a virtual messenger program is installed in the mobile communication terminal when the mobile communication terminal accesses the computer, and installs the virtual messenger program in the mobile communication terminal upon determining that the virtual messenger program is not installed.

13. The system of claim 8, wherein the mobile communication terminal determines whether the virtual messenger program is installed in the computer when accessing the computer, and installs the virtual messenger program in the computer upon determining that the virtual messenger program is not installed.

14. The system of claim 8, wherein the messenger window displays an icon including at least one of a letter envelope shape for expressing a character message item of the mobile communication terminal, a telephone shape for expressing a telephone call item, and a folder shape for expressing a file item.

* * * * *